(12) United States Patent
Olsson et al.

(10) Patent No.: US 6,393,859 B1
(45) Date of Patent: May 28, 2002

(54) APPARATUS FOR FREEZING

(75) Inventors: Lennart Olsson, Nyhamnsläge; Jonny Malmberg, Helsingborg, both of (SE)

(73) Assignee: Frigoscandia Equipment AB, Helsingborg (SE)

( * ) Notice: Subject to any disclaimer, the term of this patent is extended or adjusted under 35 U.S.C. 154(b) by 0 days.

(21) Appl. No.: 09/236,343

(22) Filed: Jan. 25, 1999

Related U.S. Application Data

(63) Continuation of application No. PCT/SE97/01316, filed on Jul. 29, 1997.

(30) Foreign Application Priority Data

Jul. 30, 1996 (SE) .............................................. 9602893

(51) Int. Cl.⁷ ................................................. A23G 9/00
(52) U.S. Cl. ......................................... 62/345; 62/380
(58) Field of Search .................................... 62/345, 380

(56) References Cited

U.S. PATENT DOCUMENTS

| 3,618,334 A | * 11/1971 | Gram .......................... 62/345 |
| 4,530,214 A | * 7/1985 | Ellsworth et al. ............. 62/345 |
| 4,699,583 A | * 10/1987 | Grigoli ........................ 62/380 |
| 5,085,059 A | * 2/1992 | Grigoli et al. ................ 62/345 |

FOREIGN PATENT DOCUMENTS

| EP | 0 605 147 | 6/1994 |
| GB | 692 977 | 6/1953 |
| SE | 457 929 | 2/1989 |

\* cited by examiner

*Primary Examiner*—William E. Tapolcai
(74) *Attorney, Agent, or Firm*—Browdy and Neimark, P.L.L.C.

(57) ABSTRACT

A food product is frozen at least partially by contacting a surface area (4) of a chilled tray (1). The tray (1) consists of a plurality of elements (2, 3). The elements are juxtaposed to form the surface area (4), they are further movable relative to each other for changing of the relative position of at least one element at a time, and finally they each occupy such a small surface in the surface area that the change of relative position is possible also after the food product part contacting the tray has been frozen.

20 Claims, 2 Drawing Sheets

APPARATUS FOR FREEZING

BACKGROUND OF THE INVENTION

Technical Field of the Invention

This application is a continuation of copending parent application No. PCT/SE97/01316, filed Jul. 29, 1997.

This invention relates to an apparatus for at least partial freezing of a food product, more specifically by contacting a surface area of a chilled tray.

PRIOR ART

For the freezing of food products, use is often made of various types of belt, which support the products during freezing. When the freezing operation is completed, the products are to be removed from the belt, which in many cases involves considerable difficulties owing to the products freezing onto the belt.

A known technique of avoiding the problem with freezing and getting stuck is to use between the belt and the food product a plastic sheet, which can easily be removed both from the belt and from the food product after freezing thereof. This plastic sheet, however, cannot be reused and, besides, can in practice be used only together with a flat belt and therefore does not allow freezing of semiliquid or liquid food products, which require some sort of cavity.

One more technique of obviating the problem with the food products freezing and getting stuck is to utilise a base, which is chilled to such a low temperature that no freezing and getting stuck can take place at all. This technique, however, is relatively energy-intensive since lower temperatures then −90° C. are usually required, which makes it necessary to use liquid nitrogen or the like.

OBJECT AND SUMMARY OF THE INVENTION

The object of the present invention therefore is to provide an apparatus, which allows freezing of both solid and liquid as well as semiliquid food products and besides obviates the problem with freezing and getting stuck without necessitating the use of very low temperatures.

According to the invention, this object is achieved by the apparatus of the type described below.

By dividing, according to the invention, the tray into a plurality of elements, which are juxtaposed and besides are movable relative to each other, it will be possible to remove a frozen food product from the tray, even if the product during freezing has frozen onto the tray. A condition for this is that each of the elements occupies such a small surface in the surface area that a change of the position of at least one element at a time relative to the adjoining element/elements is possible even after the food product part contacting the tray has been frozen.

By arranging the surface area of the tray essentially horizontally during freezing of the food product, the inventive apparatus can be used for both solid and semiliquid or liquid food products. In the case of solid or semiliquid, food products, the elements suitably can form a flat surface area, whereas in the case of liquid, but also semiliquid, food products the elements form a surface area, which comprises a plurality of open cavities for receiving the products. In both cases, the surface area is continuous and unbroken during freezing.

It should be noted that the surface area of the tray when freezing solid food products does not necessarily have to be horizontal, if suitable means are available for holding the product or products in contact with the surface area of the tray during freezing.

In a preferred embodiment, the elements are elongate and, besides, the tray can advantageously be part of a conveyor belt, the longitudinal direction of the elements preferably extending transversely of the longitudinal direction of the conveyor belt. The conveyor belt thus comprises a row of successively arranged trays, which can be connected to each other by means of their neighbouring elements in the same manner as the elements in each pair of adjoining elements in a tray are connected to each other.

The relative movability between the elements can be relatively restricted since the purpose thereof is that each element merely needs to be released from the food product part that has possibly frozen onto the element, which requires a very small relative movement. For instance, the elements can be turnable relative to each other, but alternatively they can be translatable relative to each other, either in a plane extending essentially in parallel with the surface area of the elements or perpendicularly thereto.

In consequence of the present invention, freezing of the tray onto a food product frozen in contact with the tray can be obviated, element by element, or in groups of elements simultaneously, in which case the elements in each group are preferably spaced apart by elements that are not included in the group. By each element occupying a sufficiently small surface, the freezing and getting stuck can easily be obviated with a minimum amount of force and without an essential part of the good product remaining on an individual element.

For reasons of hygiene, the elements may suitably consist of stainless steel, but also other materials with good thermal conductivity can be used. For chilling of the elements, use is preferably made of intensified blowing of cold air towards that side of the tray which is opposed to the side of the tray contacting the food product. Especially, jets of cold air can be employed, which can ensure a sufficiently quick removal of heat from the surface area of the tray.

Typically, the inventive apparatus is used for freezing of merely one layer of the food product where this contacts the tray, in which case final freezing can take place in a conventional freezer. It goes without saying, however, that for certain food products the apparatus may be well suited also for the final freezing.

BRIEF DESCRIPTION OF THE DRAWINGS

Two embodiments of the invention will be described in more detail below with reference to the accompanying drawings, in which.

DETAILED DESCRIPTION OF THE PREFERRED EMBODIMENT(S) OF THE INVENTION

Figure 1:
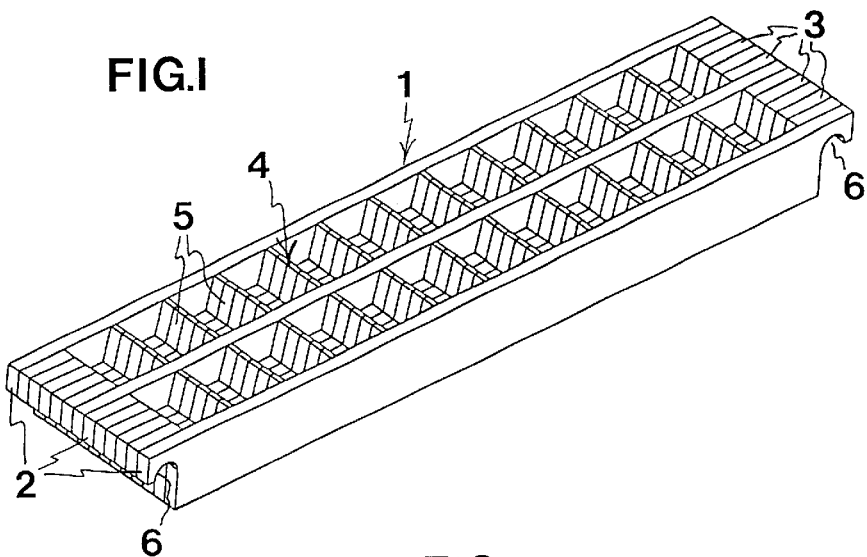
FIG. 1 is a perspective view of a first embodiment of a tray according to the invention.

A tray 1 as shown in FIG. 1 comprises a plurality of elements 2 and 3, which are elongate and juxtaposed like lamellae. Owing to the different appearance of the elements 2 and 3, the surface area 4 on the upper side of the tray 1 forms a plurality of open cavities 5. The surface area 4 is continuous and unbroken, i.e. tight, such that the cavities 5 hold a liquid food product that has been poured into them.

At each end, the elongate elements 2 and 3 have recesses 6 with downwardly directed surface, such that the elements 2 and 3 can be supported by and moved along two parallel rails (not shown) extending transversely of the longitudinal direction of the elements 2 and 3.

Figure 2:
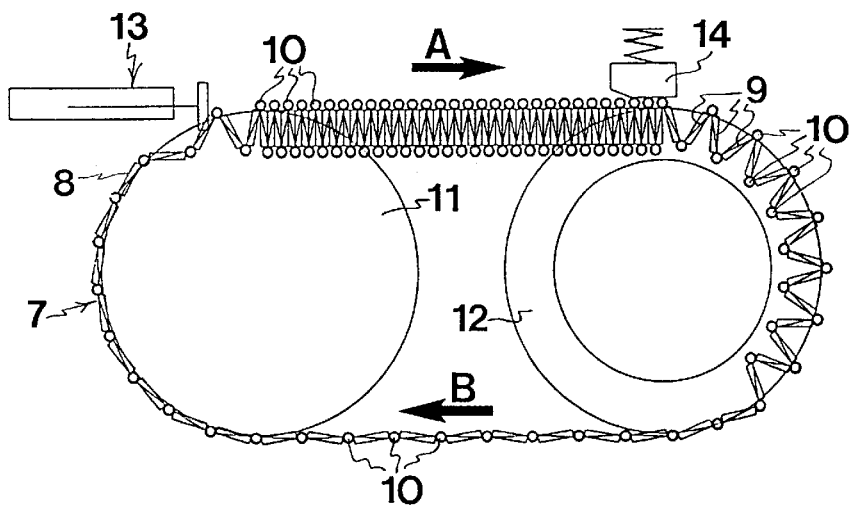
FIG. 2 is a schematic side view of a belt conveyor comprising a plurality of trays according to FIG. 1.

FIG. 2 shows a belt conveyor 7, whose conveyor belt 8 consists of a plurality of elongate elements 9, which extend transversely of the longitudinal direction of the conveyor belt 8 and at their longitudinal edges are interconnected by means of hinges 10 in such a manner that the conveyor belt 8 can be folded like an accordion belt. The conveyor belt 8 thus may consist of e.g. a plurality of trays 1, which are interconnected in the same manner as the elements 9, of which they are each made up.

The conveyor belt 8 is guided to move between and round two rollers 11 and 12. A push rod 13 and a brake block 14 hold the elements 9 pressed together like lamellae along the travelling path of the conveyor belt 8 from the roller 11 to the roller 12, as shown by arrow A. After the brake block 14 the elements 9 are successively turned relative to each other round the respective hinges 10, for instance by the successive engagement of the roller 12 with the elements 9. Along the travelling path of the conveyor belt 8 from the roller 12 to the roller 11, as indicated by arrow B, the elements 9 are completely folded away from each other so as to be positioned more or less in the same plane, and only adjacent to the push rod 13, the elements 9 are again folded into complete contact with each other.

Figure 3:
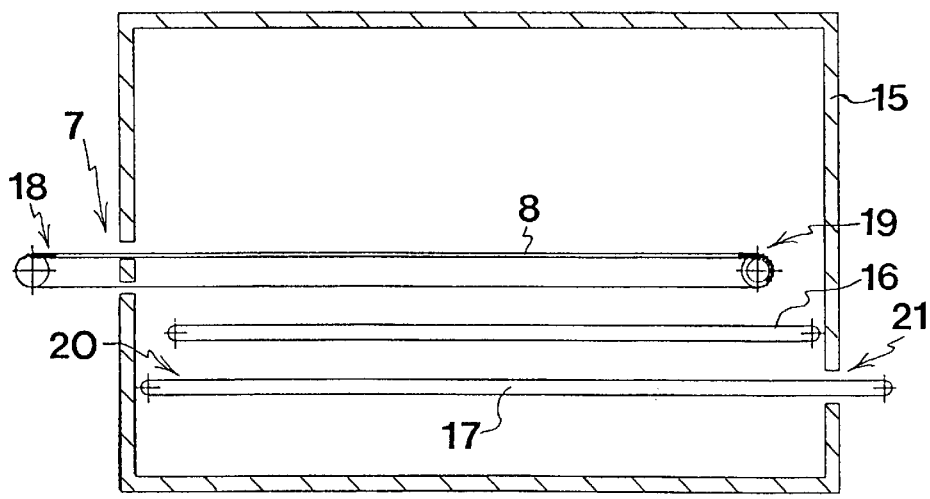
FIG. 3 is a schematic longitudinal view of a freezer, which utilises a belt conveyor according to FIG. 2.

FIG. 3 shows the belt conveyor 7 arranged in an insulated housing 15 above two further belt conveyors 16, 17, which can be of a conventional type with foraminous belts so as to allow cold air to be blown therethrough. Food products that are to be frozen are placed on the belt 8 of the belt conveyor 7 at a supply end 18 located outside the housing 15, and the food product portions contacting the conveyor belt 8 are frozen while moving to a discharge end 19. Along this distance or parts thereof, the conveyor belt 8 is chilled by means of cold jets of air, which are directed upwards to the underside of the conveyor belt 8.

The belt conveyors 16, 17 are used for the final freezing of food products which are moved by the belt conveyor 16 from the discharge end 19 of the belt conveyor 7 to the supply end 20 of the belt conveyor 17 and are moved by the belt conveyor 17 to the discharge end 21 thereof outside the housing 15.

Owing to the inventive design with a plurality of relatively narrow elements 9, typically having a width of 0.5–6 mm, the shell that is frozen at least under the food product can easily be disengaged from the elements 9 by the change of position, as the conveyor belt 8 moves round the roller 12, of one element 9 at a time relative to the subsequent element 9 seen in the travelling direction of the conveyor belt 8.

Figure 4:
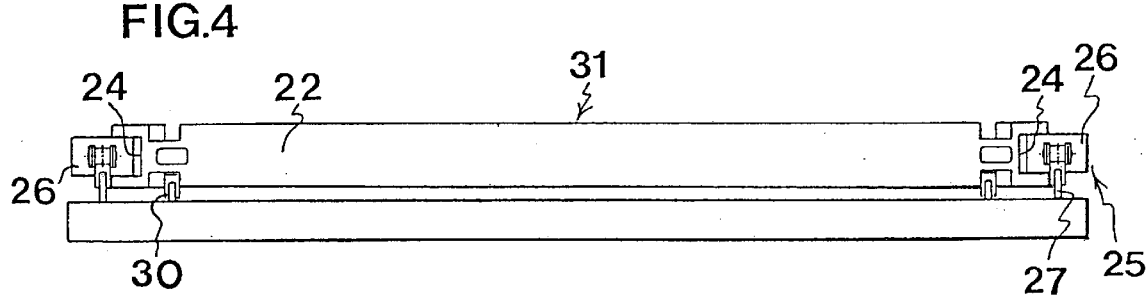
FIG. 4 is a front view of a second embodiment of a tray according to the invention.
Figure 5:
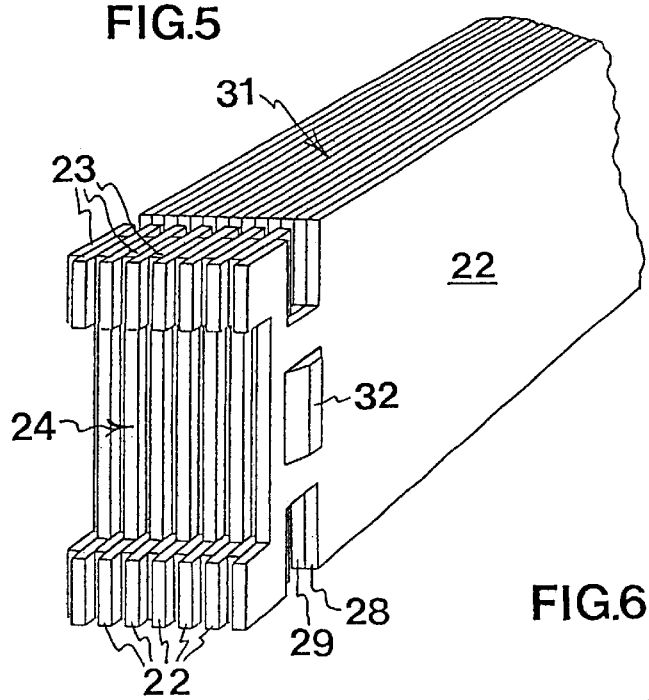
FIGS. 5 and 6 are perspective views of one end of a plurality of elements in the tray according to FIG. 4 in two different positions.
Figure 6:
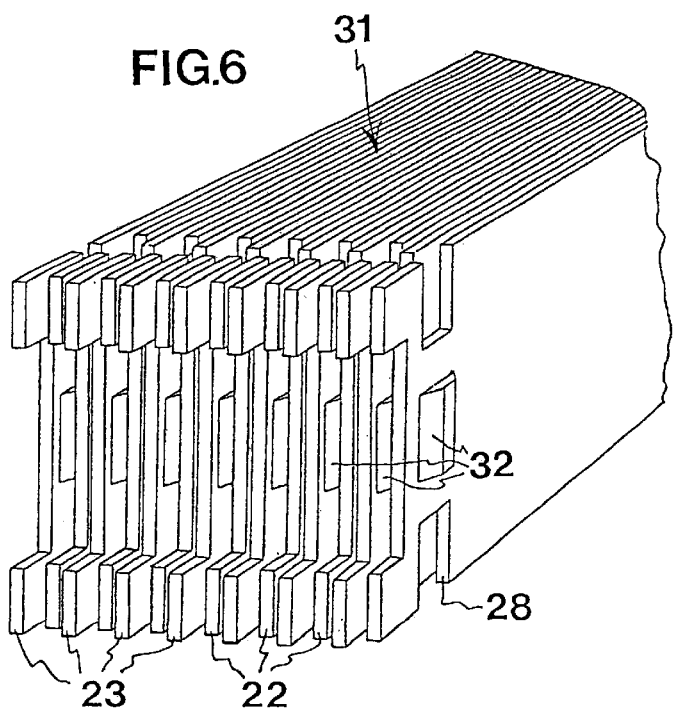

In the second embodiment illustrated in FIGS. 4–6, a plurality of elongate elements 22 and 23 are supported closely together like lamellae by each element 22, 23 having at each end a recess 24, such that the elements 22, 23 can be supported by two chains 25 with links 26 which slide or roll on supporting strips 27. Besides, at the end each element 22, 23 has an upwardly extending slot 28, 29 at its lower edge. The slots 28 have a greater width than the slots 29, the width of which can advantageously conform with the width of two guiding strips 30 which are received in the slots 28, 29 and extend along the paths of the chains 25.

The upper edges of the elements 22, 23 form a surface area 31 corresponding to the surface area 4 in FIG. 1. The surface area 31, however, is essentially completely flat. The elements 22, 23 are further symmetrical in respect of the recesses 24 and the slots 28, 29, such that by being turned through 180° about their longitudinal axis, they can form a further surface area, for instance being of an appearance differing from that of the surface area 31.

In FIG. 4, the guiding strips 30 occupy such a lateral position that the inner edge of the slots 28 and 29 at each end of the elements 22, 23 are positioned along a common line which is parallel with the travelling direction of the chains 25, which is best seen from FIG. 5. Along the circumference of, for instance, a deflection roller corresponding to the roller 12 in FIG. 2 and intended for the chains 25, the relative distance of the guiding strips 30 can be increased by a distance which preferably is equal to but not greater than the difference between the width of one of the slots 28 and the width of one of the slots 29. As a result, the elements 22 and 23 will be laterally displaced relative to each other, i.e. perform a translation in a plane parallel with the surface area 31. Thus, the elements 22, 23 will occupy the relative lateral position as shown in FIG. 6.

In FIG. 6, the elements 22, 23 are besides spaced apart in their moving direction owing to embossed portions 32 being made in each element 22, 23, said embossed portions being aligned with each other in the positions shown in FIGS. 4 and 5. During the relative lateral displacement by means of the guiding strips 30, the embossed portions 32 thus also cause a relative displacement of the elements 22, 23 in the moving direction thereof, such that gaps form between the elements 22, 23. These gaps are advantageous since, among other things, they permit simplified cleaning and effective chilling of the elements 22, 23 along the return path of the chains 25. The required number of elements 22, 23 thus also decreases as a consequence of said displacement in the moving direction of the elements 22, 23.

It will be appreciated that a great many modifications of the embodiment described above of a freezing apparatus are feasible within the scope of the invention as defined by the appended claims.

Alternatively, the elements 22, 23 could be relatively displaced perpendicular to the surface area 31. It is also possible to give the elements 9, 22 and 23 a shape other than the shown elongate shape, provided they are juxtaposed for the forming of the surface area, within which one or more food products are to be frozen at least partially, and provided they are movable relative to each other for changing of the relative position of at least one element at a time.

The dimensions of the surface of each element for contacting the food product may also vary with the form of this surface, with the material of the element, with the characteristics of the food product, with the used cooling temperature, e.g. the temperature of the jets, and with the method for changing the relative position of neighbouring elements.

Although the trays can be cooled in a very energy-saving manner with cold air, especially in the form of jets, it is of course also possible to use other cooling media.

What is claimed is:

1. An apparatus for freezing of a food product by contacting a surface area (4; 31) of a chilled tray (1), characterized in that the tray (1) consists of a plurality of elements (2, 3; 9; 22, 23), which are juxtaposed to form a surface area (4; 31), said elements being movable relative to each other to change a relative position of at least one element at a time and each element occupying such a small surface in the surface area (4; 31) that the change of the relative position is possible after freezing of the food product contacting the tray.

2. An apparatus as claimed in claim 1, characterised in that the surface area (4) of the tray (1) is essentially horizontal during freezing of the food product.

3. An apparatus as claimed in claim 1, characterised in that the elements (9; 22, 23) form a flat surface area.

4. An apparatus as claimed in claim 2, characterised in that the elements (2, 3) form a surface area (4) which comprises a plurality of open cavities (5) for receiving a semiliquid or liquid food product.

5. An apparatus as claimed in claim 1, characterised in that the elements (2, 3; 9; 22, 23) are elongate.

6. An apparatus as claimed in claim 1, characterised in that the elements (2, 3; 9; 22, 23) are parts of a conveyor belt (8).

7. An apparatus as claimed in claim 1, characterised in that the change of the relative position of the elements (9) is a turning.

8. An apparatus as claimed in claim 1, characterised in that the change of the relative position of the elements is a translation perpendicular to a plane extending essentially in parallel with the surface area.

9. An apparatus as claimed in claim 1, characterised in that the change of the relative position of the elements (22, 23) is a translation in a plane extending essentially in parallel with the surface area (31).

10. An apparatus as claimed in claim 1, characterised in that the tray (4) on the side opposite to the side contacting the food product is chilled by intensified blowing of cold air.

11. An apparatus as claimed in claim 2, characterised in that the elements (9; 22, 23) form a flat surface area.

12. An apparatus as claimed in claim 11, characterised in that the elements (2, 3; 9; 22, 23) are parts of a conveyor belt (8).

13. An apparatus as claimed in claim 3, characterised in that the elements (2, 3; 9; 22, 23) are parts of a conveyor belt (8).

14. An apparatus as claimed in claim 2, characterised in that the elements (2, 3; 9; 22, 23) are parts of a conveyor belt (8).

15. An apparatus as claimed in claim 14, characterised in that the tray (4) on the side opposite to the side contacting the food product is chilled by intensified blowing of cold air.

16. An apparatus as claimed in claim 13, characterised in that the tray (4) on the side opposite to the side contacting the food product is chilled by intensified blowing of cold air.

17. An apparatus as claimed in claim 9, characterised in that the tray (4) on the side opposite to the side contacting the food product is chilled by intensified blowing of cold air.

18. An apparatus as claimed in claim 8, characterised in that the tray (4) on the side opposite to the side contacting the food product is chilled by intensified blowing of cold air.

19. An apparatus as claimed in claim 7, characterised in that the tray (4) on the side opposite to the side contacting the food product is chilled by intensified blowing of cold air.

20. An apparatus as claimed in claim 4, characterised in that the tray (4) on the side opposite to the side contacting the food product is chilled by intensified blowing of cold air.

\* \* \* \* \*